United States Patent
Miao et al.

(10) Patent No.: US 12,382,412 B2
(45) Date of Patent: Aug. 5, 2025

(54) METHOD FOR DETERMINING TRANSMISSION TIMING AMONG NODES OF A NETWORK

(71) Applicant: ZTE CORPORATION, Guangdong (CN)

(72) Inventors: Ting Miao, Shenzhen (CN); Weimin Xing, Shenzhen (CN); Feng Bi, Shenzhen (CN); Youxiong Lu, Shenzhen (CN); Wenhao Liu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 413 days.

(21) Appl. No.: 17/876,633

(22) Filed: Jul. 29, 2022

(65) Prior Publication Data

US 2022/0394649 A1     Dec. 8, 2022

Related U.S. Application Data

(63) Continuation of application No. PCT/CN2020/075165, filed on Feb. 14, 2020.

(51) Int. Cl.
*H04W 56/00* (2009.01)
(52) U.S. Cl.
CPC ..... *H04W 56/0045* (2013.01); *H04W 56/005* (2013.01)
(58) Field of Classification Search
CPC .......... H04W 56/0045; H04W 56/005
See application file for complete search history.

(56) References Cited

U.S. PATENT DOCUMENTS

| 2019/0394738 A1 | 12/2019 | Abedini et al. |
| 2020/0015316 A1* | 1/2020 | Islam ............... H04W 56/0015 |

(Continued)

FOREIGN PATENT DOCUMENTS

| CN | 110535677 A | * 12/2019 | ......... H04L 27/2646 |
| CN | 110536406 A | * 12/2019 | ............ H04W 56/00 |

(Continued)

OTHER PUBLICATIONS

Zte et al.: "Summary of offline discussion on 38.213 CR text for case-1 timing" RI-1913316, 3GPP TSG RAN WGI Meeting #99 Nov. 25, 2019 (Nov. 25, 2019) Reno, USA (8 pages) (Year: 2019).*

(Continued)

*Primary Examiner* — Charles N Appiah
*Assistant Examiner* — Nikita H Patel
(74) *Attorney, Agent, or Firm* — Foley & Lardner LLP

(57) ABSTRACT

A system and method for receiving timing configuration information are disclosed herein. In one embodiment, a method performed by a first node includes receiving, by the first node, timing configuration information, the timing configuration information comprises at least one of a timing advance parameter ($N_{TA}$), a timing advance offset ($N_{TA,offset}$), $N_{TA}$ granularity indication information, time difference information at a second node, a timing adjustment parameter ($\Delta T_q$). The method includes determining, by the first node, at least one of UL Tx timing or DL Tx timing based on the timing configuration information.

20 Claims, 10 Drawing Sheets

(56) References Cited

U.S. PATENT DOCUMENTS

2020/0053679 A1     2/2020    Bendlin et al.
2022/0174668 A1*   6/2022    Yuan ................ H04W 74/0833
2024/0187954 A1*   6/2024    Zhou ................ H04W 36/0077

FOREIGN PATENT DOCUMENTS

CN           110536407 A   *   12/2019          G01S 19/05
CN           110536466 A       12/2019
WO    WO-2019/246248 A1   12/2019

OTHER PUBLICATIONS

International Search Report and Written Opinion for PCT Appl. No. PCT/CN2020/075165 mailed Nov. 19, 2020 (9 Pages).
International Search Report and Written Opinion for PCT Appl. No. PCT/CN2020/075166 mailed Nov. 6, 2020. (8 pages).
Nokia, et al.: IAB Synchronization 3GPP TSG RAN WGI Meeting #93, RI-1806664, May 12, 2018 (May 12, 2018) section 2.2 Busan, Korea (5 pages).
ZTE et al.: "Summary of offline discussion on 38.213 CR text for case-1 timing" RI-1913316, 3GPP TSG RAN WGI Meeting #99 Nov. 25, 2019 (Nov. 25, 2019) Reno, USA (8 pages).

\* cited by examiner

| SCS [kHz] | Max $T_{delta}$ [Tc] | Min $T_{delta}$ [Tc] |
|---|---|---|
| 15 | $-N_{TA\ offset}/2 + 6256$ | $-N_{TA\ offset}/2 - 70528$ |
| 30 | $-N_{TA\ offset}/2 + 6128$ | $-N_{TA\ offset}/2 - 35328$ |
| 60 | $-N_{TA\ offset}/2 + 6032$ | $-N_{TA\ offset}/2 - 17664$ |
| 120 | $-N_{TA\ offset}/2 + 6032$ | $-N_{TA\ offset}/2 - 8816$ |

Figure 2

METHOD FOR DETERMINING TRANSMISSION TIMING AMONG NODES OF A NETWORK

CROSS-REFERENCE TO RELATED APPLICATION

This application claims the benefit of priority under 35 U.S.C. § 120 as a continuation of PCT Patent Application No. PCT/CN2020/075165, filed on Feb. 14, 2020, the disclosure of which is incorporated herein by reference in its entirety.

TECHNICAL FIELD

The disclosure relates generally to wireless communications and, more particularly, to systems and methods for determining transmission timing among nodes of a network.

BACKGROUND

The new-generation mobile communication system NR (new radio) allows more flexible network deployment than 2G, 3G, and 4G systems. Currently, a new type of node that integrates the backhaul link and the normal access link, that is, the IAB node (Integrated Access and Backhaul Node), can provide more flexible coverage and network deployment than a single cellular without the need of laying a large number of optical fibers, saving network deployment costs.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In one embodiment, a method performed by a first node includes receiving, by the first node, timing configuration information, the timing configuration information comprises at least one of a timing advance parameter ($N_{TA}$), a timing advance offset ($N_{TA,offset}$), $N_{TA}$ granularity indication information, time difference information at a second node, a timing adjustment parameter ($\Delta T_q$). The method includes determining, by the first node, at least one of uplink transmission timing ($UL_{Tx}$) or downlink transmission timing ($DL_{Tx}$) based on the timing configuration information.

In another embodiment, a method performed by a second node includes sending, by the second node to a first node, timing configuration information, the timing configuration information comprises at least one of a timing advance parameter ($N_{TA}$), a timing advance offset ($N_{TA,offset}$), $N_{TA}$ granularity indication information, time difference information at a second node, a timing adjustment parameter ($\Delta T_q$), the timing configuration information related to determining at least one of uplink transmission timing ($UL_{Tx}$) or downlink transmission timing ($DL_{Tx}$) of the first node.

The above and other aspects and their implementations are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 2 illustrates a table of time difference information, in accordance with some embodiments of the present disclosure.

DETAILED DESCRIPTION OF EXAMPLE EMBODIMENTS

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

For a new generation mobile communication system, a node that has a wired backhaul link with the core network is a donor integrated access and backhaul (IAB) (IAB donor). The IAB donor includes a centralized unit (CU) and one or more distributed units (DUs) that can obtain downlink data or send uplink data to the core network. A node that is connected wirelessly to the donor IAB (or the upper-layer JAB node) is an IAB node. There is no direct connection between the IAB node and the core network. Its interaction with the core network is forwarded one or more times, and realized by the donor IAB. Both the donor IAB and the IAB node support terminal access.

The IAB node has two functions. The first function is a distributed unit DU function. An JAB node operating in its DU function behaves as a base station. That is, the IAB node can provide wireless access function for the child node or terminal. The second function is a mobile terminal (MT, Mobile-Termination) function. An IAB node operating in its MT function behaves as a terminal. That is, the IAB node is controlled and scheduled by the parent node (IAB node or donor IAB).

Figure 1:
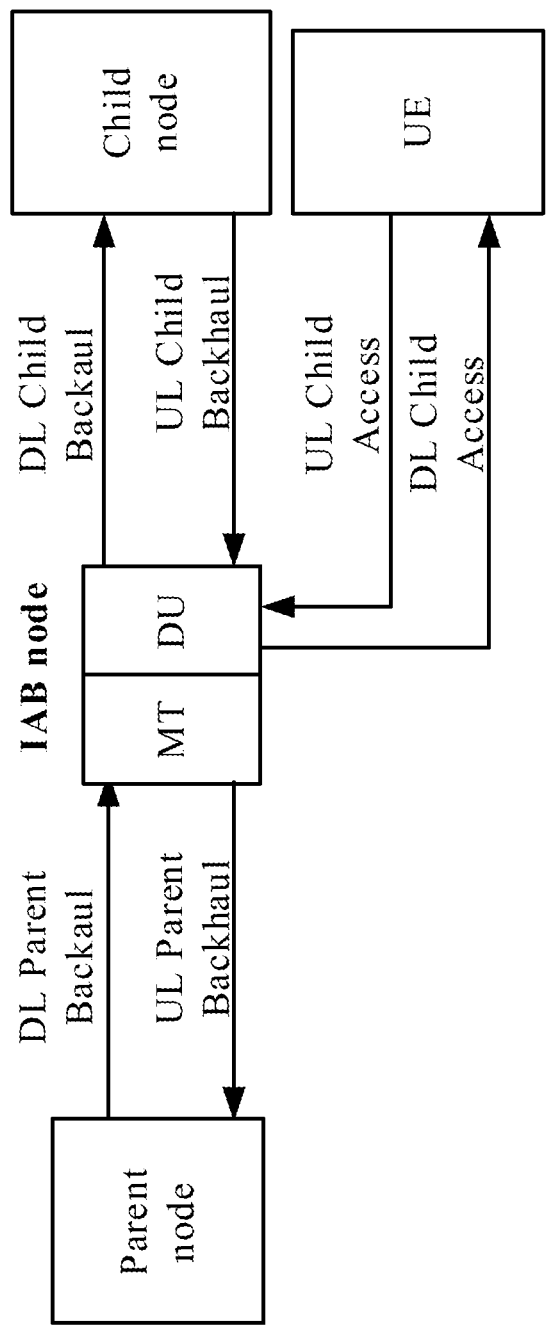
FIG. 1 illustrates relationship and links of among nodes in the IAB network, in accordance with some embodiments of the present disclosure.

FIG. 1 shows the relationship and links of among nodes in the IAB network. The IAB node is used as a reference. The parent node of the IAB node can be a IAB node or a donor IAB. The next-level node of the IAB node can be at least one of: a) another IAB node (Child node), or b) a UE. The link between an JAB node and its parent node is called a parent backhaul link and it is divided into a downlink parent backhaul link (DL Parent Backhaul) and an uplink parent backhaul link (UL Parent Backhaul link). The links between an JAB node and its child node is called child backhaul link and is divided into a downlink child backhaul link (DL Child Backhaul) and an uplink child backhaul links (UL Child Backhaul). The link between the IAB node and the UE it serves is called a child access link and it is divided into a downlink child access link (DL Child access) and an uplink child access link (UL Child access).

The IAB needs to study the following timings: Case 1—DL transmission timing alignment across IAB-nodes and IAB-donors; Case 6—DL transmission timing for all IAB-nodes is aligned with the parent IAB-node or donor DL timing, and UL transmission timing of an IAB-node can be aligned with the IAB-node's DL transmission timing; and Case 7—DL transmission timing for all IAB-nodes is aligned with the parent IAB-node or donor DL timing, and UL reception timing of an IAB-node can be aligned with the IAB-node's DL reception timing;

For Case 1, the IAB node uses the same method as a UE to determine the uplink transmission (e.g., UL Tx) timing, that is, for the IAB node, an advance amount for UL Tx timing $UL_{Tx}$ relative to (e.g., with respect to) downlink reception timing $DL_{Rx}$ is $(N_{TA}+N_{TA,offset}) \cdot T_c$. Accordingly, $UL_{Tx}=DL_{Rx}-(N_{TA}+N_{TA,offset}) \cdot T_c$.

The $N_{TA}$ is obtained according to the timing advance TA value indicated by the timing advance command in the random access response or obtained based on the current timing advance TA value ($TA_{old}$) of the IAB node and the timing advance adjustment amount indicated by the timing advance command media access control (MAC) control element (CE) relative to the current TA value. $N_{TA,offset}$ is the offset value for timing advance (timing advance offset). $T_c$ is the time unit of the NR system.

For Case 1, in response to determining that $(N_{TA}+N_{TA,offset}) \cdot T_c/2+T_{delta}$ is greater than 0, the IAB node adjusts its downlink transmission (e.g., DL Tx) timing $DL_{Tx}$ based on this value $(N_{TA}+N_{TA,offset}) \cdot T_c/2+T_{delta}$ relative to downlink reception (e.g., DL Rx) timing $DL_{Rx}$. That is, for the IAB node, the advance amount for DL Tx timing $DL_{Tx}$ relative to the DL Rx timing $DL_{Rx}$ is $(N_{TA}+N_{TA,offset}) \cdot T_c/2+T_{delta}$.

$T_{delta}$ is a parameter that corresponds to (−½) of time interval at the parent node between the start of uplink reception frame i for the IAB node and the start of DL Tx frame i. It can be understood as the time difference information is between uplink reception timing $UL_{Rx,p}$ of the serving cell (parent node) and DL Tx timing $DL_{Tx,p}$ of the serving cell (parent node). For example, it is 0.5 times the time difference (between the uplink reception timing $UL_{Rx,p}$ and the DL Tx timing $DL_{Tx,p}$ of the serving cell), and the value range of $T_{delta}$ is related to the subcarrier interval SCS, as shown in FIG. 2.

For Case 6 and Case 7 timing, it is necessary to further determine the timing implementation solution to solve the timing alignment problem if an IAB node simultaneously transmits or receives in its the parent backhaul link and the child backhaul link (or child access link) using the frequency domain multiplexing (FDM) or spatial domain multiplexing (SDM).

The present disclosure proposes a method for determining an UL Tx timing and a DL Tx timing of an IAB node in a case that the parent backhaul link and the child backhaul link (or the child access link) of the IAB node use FDM/SDM to send at the same time.

In some embodiments, the present disclosure includes a first node, a second node, and a third node. The first node can be one of the following: an IAB node or a relay node. The second node is a higher layer node (e.g., parent node) of the first node and can be one of the following: an IAB donor, a IAB node, CU, OAM (Operation Administration and Maintenance), a relay node, or a base station (e.g., a network, a gNB, an eNB, a wireless communication node, a node, a wireless communication device, and the like). The third node is a lower layer node (e.g., child node) of the first node and can be one of the following: a IAB node, relay node, or a UE (e.g., a terminal, a wireless communication device, a user equipment device, a UE, a mobile device, a mobile phone, a wireless communication node, etc.). In some embodiments, IAB node uses timing advance amount $(N_{TA}+N_{TA,offset}) \cdot T_c$ relative to its DL Rx timing to determine the UL Tx timing and the DL Tx timing. In some embodiments, the first node receives timing configuration information. the timing configuration information comprises at least one of a timing advance parameter ($N_{TA}$), a timing advance offset ($N_{TA,offset}$), $N_{TA}$ granularity indication information, time difference information at the second node, and a timing adjustment parameter ($\Delta T_q$). In some embodiments, the first node determines at least one of UL Tx timing ($UL_{Tx}$) or DL Tx timing ($DL_{Tx}$) based on the timing configuration information. In some embodiments, the second node sends, to a first node, timing configuration information, the timing configuration information comprises at least one of a timing advance parameter ($N_{TA}$), a timing advance offset ($N_{TA,offset}$), $N_{TA}$ granularity indication information, time difference information at a second node, a timing adjustment parameter ($\Delta T_q$), the timing configuration information related to determining at least one of UL Tx timing ($UL_{Tx}$) or DL Tx timing ($DL_{Tx}$) of the first node.

The granularity of the time difference information can be predefined or configured.

Figure 3:
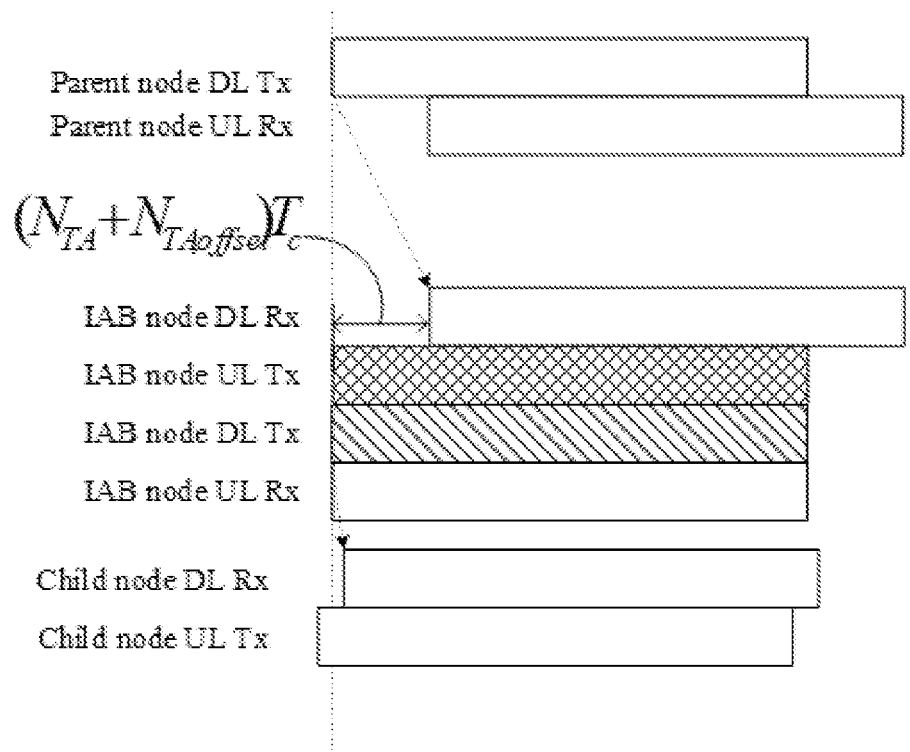
FIG. 3 illustrates schematic diagram of the IAB node determining the uplink transmission (UL Tx) timing and the downlink transmission (DL Tx) timing, in accordance with some embodiments of the present disclosure.

FIG. 3 shows a schematic diagram of the IAB node determining the UL Tx timing and the DL Tx timing. For example, for the IAB node, the advance amount for the DL Tx timing $DL_{Tx}$ and the UL Tx timing $UL_{Tx}$ relative to the DL Rx timing $DL_{Rx}$ is $(N_{TA}+N_{TA,offset}) \cdot T_c$. Accordingly, $UL_{Tx}=DL_{Tx}=DL_{Rx}-(N_{TA}+N_{TA,offset}) \cdot T_c$. $N_{TA}$ is configured by parent node or serving cell. $N_{TA,offset}$ is configured by the parent node or serving cell. If $N_{TA,offset}$ is not configured for an IAB, the IAB node determines a default value according to predefined rules for $N_{TA,offset}$. $T_c$ is the basic time unit.

IAB nodes can assume $(N_{TA}+N_{TA,offset}) \cdot T_c$ is the transmission delay between the IAB node and the parent node, that is, the time difference between a transmission of a signal from the parent node (serving cell) and a reception of the signal by the MT of the IAB node. In this way, the IAB node and the parent node can be synchronized, or their DL Tx timing can be aligned. In some embodiments, at least one of: the UL Tx timing $UL_{Tx}$ is determined based on an amount of timing adjustment relative to DL Rx timing $DL_{Rx}$ of the first node, wherein the amount of timing adjustment is determined using $(N_{TA}+N_{TA,offset}) \cdot T_c$, or the DL Tx timing $DL_{Tx}$ is determined based on the amount of timing adjustment related to the DL Rx timing $DL_{Rx}$ of the first node, wherein the amount of timing adjustment is determined using $(N_{TA}+N_{TA,offset}) \cdot T_c$.

Optionally, the IAB node reports information related to time difference between reference timing and the DL Rx timing. Reference timing can include at least one of UL Tx timing or DL Tx timing. The information related to time difference is any one of the following: 1/N of the actual time difference between the UL Tx timing and the DL Rx timing of the IAB node, 1/M of the actual time difference between the DL Tx timing and the DL Rx timing of the IAB node, 1/K of the timing advance amount TA which is an accumulation of $N_{TA}$ indicated by timing advance parameters received by the IAB node or a time difference between the UL Tx timing and the DL Rx timing of the IAB node excluding the timing advance offset ($N_{TA,offset}$), 1/L of TA+$N_{TA,offset}$, where N, M, K and L are all integers. In some embodiments, the first node reports information related to time difference between reference timing and the DL Rx timing $DL_{Rx}$ of the first node, wherein the reference timing is at least one of the UL Tx timing $UL_{Tx}$ or DL Tx timing $DL_{Tx}$ of the first node. In some embodiments, the information related to time difference is one of $$\frac{1}{N}$$

multiplied by a first actual timing difference between the UL Tx timing $UL_{Tx}$ and the DL Rx timing $DL_{Rx}$ of the first node, $$\frac{1}{M}$$

multiplied by a second actual timing difference between the DL Tx timing $DL_{Tx}$ and the DL Rx timing $DL_{Rx}$ of the first node, $$\frac{1}{K}$$

Multiplied by the timing advance amount (TA), wherein TA is an accumulation of $N_{TA}$ indicated by timing advance parameters received by the first node or a time difference between the UL Tx timing $UL_{Tx}$ and the DL Rx timing $DL_{Rx}$ of the first node excluding the timing advance offset ($N_{TA,offset}$), and $$\frac{1}{L}$$

multiplied by the sum of TA and the timing advance offset ($N_{TA,offset}$). In some embodiments, the second node receives, from the first node, information related to time difference between reference timing and the DL Rx timing $DL_{Rx}$ of the first node. In some embodiments, the reference timing is one of the UL Tx timing $UL_{Tx}$ or DL Tx timing $DL_{Tx}$ of the first node, and the information related to time difference is one of $$\frac{1}{N}$$

multiplied by a first actual timing difference between the UL Tx timing $UL_{Tx}$ and the DL Rx timing $DL_{Rx}$ of the first node, $$\frac{1}{M}$$

multiplied by a second actual timing difference between the DL Tx timing $DL_{Tx}$ and the DL Rx timing $DL_{Rx}$ of the first node, $$\frac{1}{K}$$

multiplied by the timing advance amount (TA), wherein TA is an accumulation of $N_{TA}$ indicated by timing advance parameters received by the first node or a time difference between UL Tx timing $UL_{Tx}$ and the DL Rx timing $DL_{Rx}$ of the first node excluding the timing advance offset ($N_{TA,offset}$), and $$\frac{1}{L}$$

multiplied by the sum of TA and the timing advance offset ($N_{TA,offset}$), wherein each of N, M, K, and L is an integer.

The granularity of information related to time difference can be predefined or configured.

In order to maintain the DL Tx timing alignment between the IAB node and the parent node, the IAB node needs to report 1/N of the actual time difference between its UL Tx timing/DL Tx timing and DL Rx timing, where N is an integer, preferably N=1 or 2, used by the parent node to determine the timing advance information to be sent to the IAB node. timing advance information is used for IAB node obtaining $N_{TA}$, such that $(N_{TA}+N_{TA,offset})\cdot T_c$ can be equal to the transmission delay between the IAB node and the parent node.

Alternatively, the IAB node receives the time difference information. The time difference information is information related to a time difference between an uplink receiving timing and a DL Tx timing of a parent node. For example, the time difference information is the time difference between the uplink reception (UL Rx) timing and the DL Tx timing of the parent node. In order to maintain the DL Tx timing alignment between the IAB node and the parent node, the IAB node compares the time difference between its own reference timing and DL Rx timing with the received time difference information (e.g. UL Rx timing minus DL Tx timing of the parent node) from the parent node, if the former is less than the latter, the IAB node advances its reference timing, otherwise, the IAB node delays its reference timing, wherein the reference timing is at least one of UL Tx timing or DL Tx timing. In some embodiments, the time difference information relates to $$\frac{1}{N}$$

of a time interval at the second node between a start of an uplink reception frame i for the first node and a start of a DL Tx frame i, or $$\frac{1}{N}$$

of a time interval between a start of an uplink reception frame i and a start of a DL Tx frame i of the second node, wherein N is an integer.

Optionally, the IAB node reports the $N_{TA}$ granularity capability information (i.e. timing advance adjustment granularity capability). In some embodiments, the first node reports $N_{TA}$ granularity capability information supported by the first node, where $N_{TA}$ granularity capability can be the one of supporting the first granularity, supporting the second granularity, or supporting both the first granularity and the second granularity. In some embodiments, the second node receives, from the first node, $N_{TA}$ granularity capability information supported by the first node. Optionally, the IAB node receives $N_{TA}$ granularity indication information. The granularity indication information is used to indicate which granularity is used to calculate $N_{TA}$: the first granularity, or the second granularity. One of the first granularity and the second granularity is a coarser granularity and the other is a finer granularity. For example, 1 bit is used to indicate whether a coarser granularity (granularity in the prior art) or a finer granularity is used.

In the prior art, $N_{TA}$ granularity is $16\cdot 64/2^\mu \cdot T_c$, where μ is the subcarrier spacing configuration corresponding to the subcarrier spacing $2^\mu \cdot 15$ kHz. Adopting a higher $N_{TA}$ granularity can more accurately realize the DL Tx timing alignment between the IAB node and the parent node. For example, the granularity of $N_{TA}$ is $64T_c$ for frequency range 1 and $32T_c$ for frequency range 2; or a value related to the subcarrier spacing and smaller than $16\cdot 64/2^\mu \cdot T_c$; or other values.

Whether an IAB node supports higher/finer $N_{TA}$ granularity depends on the capabilities of the IAB node. For IAB nodes or terminals that do not support higher $N_{TA}$ granularity, the granularity in the prior art can only be used. For IAB nodes or the terminals that support higher $N_{TA}$ granularity, the granularity is configurable. For example, the granularity in the existing technology of NR may be adopted, or a higher granularity may be adopted, and a higher/finer $N_{TA}$ granularity may be adopted by default.

Optionally, the IAB node adjusts its UL Tx timing and DL Tx timing by $(N_{TA}+N_{TA,offset})\cdot T_c$ when it is greater than 0.

Figure 4A:
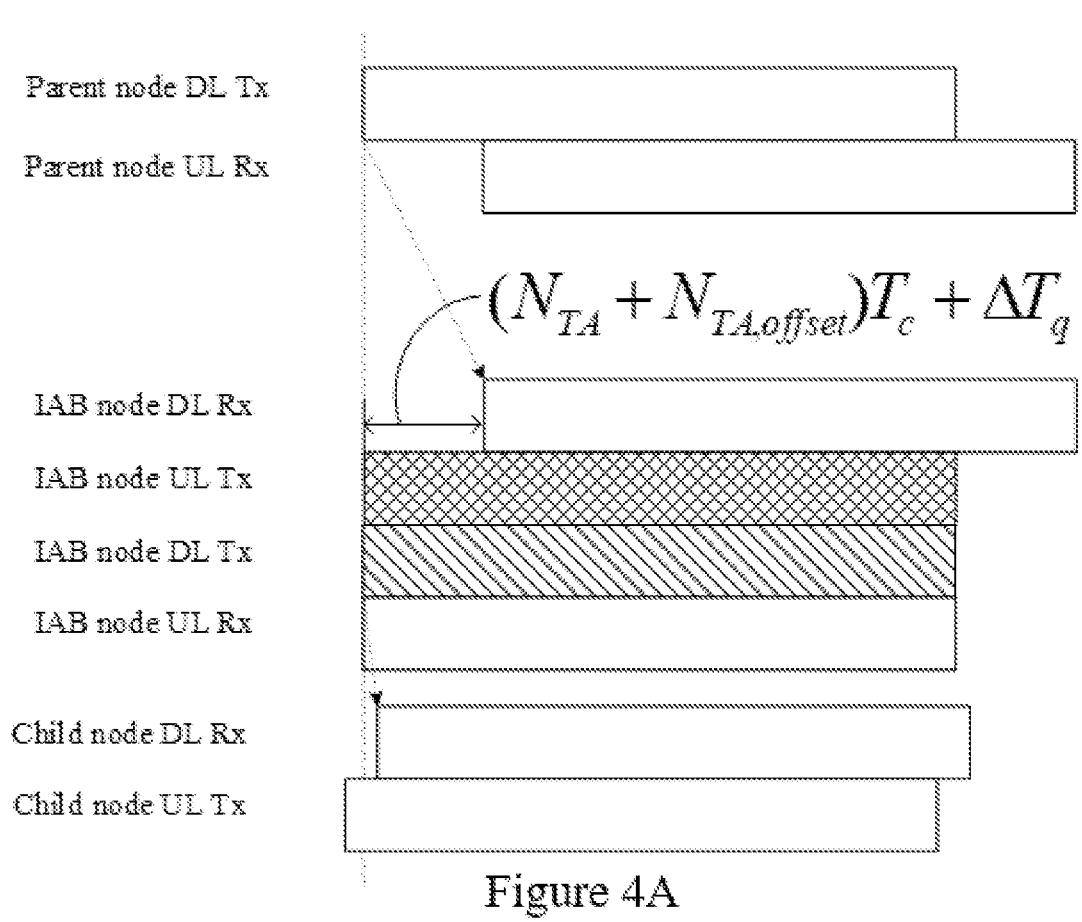
FIG. 4A illustrates a schematic diagram of the JAB node determining the UL Tx timing and the DL Tx timing, in accordance with some embodiments of the present disclosure.

In some embodiments, IAB node receives timing adjustment $\Delta T_q$. In some embodiments, The IAB node adjusts at least one of the UL Tx timing and the DL Tx timing based on $\Delta T_q$. FIG. 4A shows a schematic diagram of the IAB node determining the UL Tx timing $UL_{Tx}$ and the DL Tx timing $DL_{Tx}$. For example, for an IAB node, the advance amount for its UL Tx timing $UL_{Tx}$ and DL Tx timing $DL_{Tx}$ relative to its DL Rx timing $DL_{Rx}$ is $(N_{TA}+N_{TA,offset})\cdot T_c+\Delta T_q$. That is, $UL_{Tx}=DL_{Tx}=DL_{Rx}-(N_{TA}+N_{TA,offset})\cdot T_c-\Delta T_q$. In some embodiments, the UL Tx timing $UL_{Tx}$ is determined based on an amount of timing adjustment relative to DL Rx timing $DL_{Rx}$ of the first node, wherein the amount of timing adjustment is determined using $(N_{TA}+N_{TA,offset})\cdot T_c+\Delta T_q$. In some embodiments, the DL Tx timing $DL_{Tx}$ is determined based on the amount of timing adjustment relative to the DL Rx timing $DL_{Rx}$ of the first node, wherein the amount of timing adjustment is determined using $(N_{TA}+N_{TA,offset})\cdot T_c+\Delta T_q$.

In some embodiments, the advance amount for the UL Tx timing $UL_{Tx}$ relative to the current UL Tx timing $UL_{Tx,old}$ or the current DL Tx timing $DL_{Tx,old}$ is $\Delta T_q$. That is, $UL_{Tx}=UL_{Tx,old}-\Delta T_q$ or $UL_{Tx}=DL_{Tx,old}-\Delta T_q$.

In some embodiments, the advance amount for the DL Tx timing $DL_{Tx}$ relative to the current UL Tx timing $UL_{Tx,old}$ or the current DL Tx timing $DL_{Tx,old}$ is $\Delta T_q$. That is, $UL_{Tx}=UL_{Tx,old}-\Delta T_q$ or $UL_{Tx}=DL_{Tx,old}-\Delta T_q$. That is, $DL_{Tx}=UL_{Tx,old}-\Delta T_q$ or $DL_{Tx}=DL_{Tx,old}-\Delta T_q$.

Figure 4B:
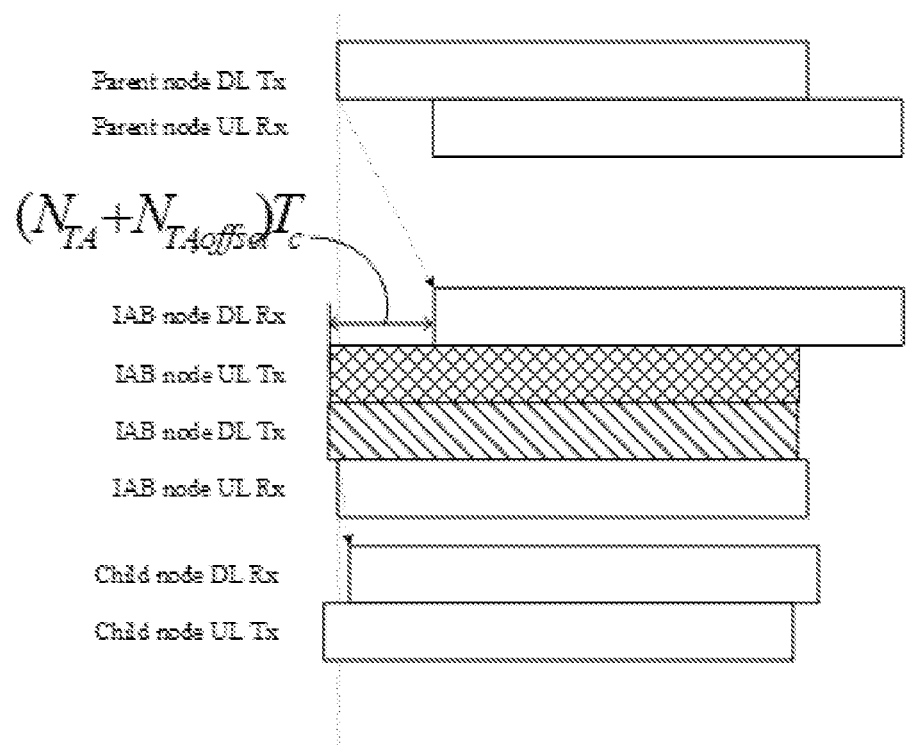
FIG. 4B illustrates a schematic diagram of the IAB node determining the UL Tx timing and the DL Tx timing, in accordance with some embodiments of the present disclosure.

Because in the prior art, $N_{TA}$ the granularity ($16\cdot 64/2^\mu\cdot T_c$) is large, when the UL Tx timing and DL Tx timing of the IAB node are advanced $(N_{TA}+N_{TA,offset})-T_c$ relative to the DL Rx timing, the DL Tx timing of the IAB node and the parent node (serving cell) may not be aligned, that is, the network is not synchronized, as shown in FIG. 4B.

In order to better achieve the DL Tx timing alignment between the IAB node and the parent node, the parent node can provide a finer granularity time adjustment amount $\Delta T_q$ for the IAB node. For example, the granularity of $\Delta T_q$ is: $64T_c$ for FR1 and $32T_c$ for FR2, a value related to the subcarrier spacing and smaller than $16\cdot 64/2^\mu\cdot T_c$, or other values.

Optionally, the IAB node reports the information related to time difference between reference timing and the DL Rx timing of the IAB node, wherein the reference timing is at least one of the UL Tx timing or the DL Tx timing. In order to maintain the DL Tx timing alignment between the IAB node and the parent node, the IAB node needs to report an actual time difference between its UL Tx timing and the DL Rx timing or between its DL Tx timing and the DL Rx timing, where the time difference is used for determining the timing adjustment $\Delta T_q$ by the parent node. In some embodiments, the first node reports information related to time difference. In some embodiments, the information related to time difference relates to one of a first timing difference between the UL Tx timing $UL_{Tx}$ and the DL Rx timing $DL_{Rx}$ of the first node, or a second timing difference between the DL Tx timing $DL_{Tx}$ and the DL Rx timing $DL_{Rx}$ of the first node.

The information related to time difference is similar to the foregoing embodiment.

Optionally, the IAB node adjusts its UL Tx timing and DL Tx timing by $(N_{TA}+N_{TA,offset})\cdot T_c+\Delta T_q$ when it is greater than 0.

In some embodiments, the IAB node uses timing advance amount $(N_{TA}+N_{TA,offset})\cdot T_c/2+T_{delta}$ relative to its DL Rx timing to determine the UL Tx timing and the DL Tx timing. In some embodiments, IAB node receives time difference information and the IAB node adjusts at least one of the UL Tx timing and the DL Tx timing according to the time difference information. In some embodiments, the time difference information is information related to the time difference between the uplink receiving timing and the DL Tx timing of the parent node, and is provided by the parent node. In some embodiments, the first node receives time difference information and adjusts at least one of the UL Tx timing $UL_{Tx}$ and the DL Tx timing $DL_{Tx}$ using the time difference information. In some embodiments, the time difference information is received by the first node from the second node and the time difference information relates to a time difference at the second node between a start of an uplink reception frame i for the first node and a start of a DL Tx frame i or a time difference between a start of a uplink reception frame i and a start of a DL Tx frame i of the second node.

For the IAB node, the advance amount for the UL Tx timing $UL_{Tx}$ and the DL Tx timing $DL_{Tx}$ relative to the DL Rx timing $DL_{Rx}$ is $(N_{TA}+N_{TA,offset})\cdot T_c/2+T_{delta}$. That is, $UL_{Tx}=DL_{Tx}=DL_{Rx}-(N_A+N_{TA,offset})\cdot T_c/2-T_{delta}$. In some embodiments, the UL Tx timing $UL_{Tx}$ is determined based on an amount of timing adjustment relative to DL Rx timing $DL_{Rx}$ of the first node, wherein the amount of timing adjustment is determined using $(N_{TA}+N_{TA,offset})\cdot T_c/2+T_{delta}$. In some embodiments, the DL Tx timing $DL_{Tx}$ is determined based on the amount of timing adjustment relative to the DL Rx timing $DL_{Rx}$ of the first node, wherein the amount of timing adjustment is determined using $(N_{TA}+N_{TA,offset})\cdot T_c/2+T_{delta}$. In some embodiments, $T_{delta}$ is a parameter that corresponds to $(-\frac{1}{2})$ of a time interval at the second node between a start of an uplink reception frame i for the first node and a start of a DL Tx frame i or $(-\frac{1}{2})$ of a time interval between a start of an uplink reception frame i and a start of a DL Tx frame i of the second node.

If the IAB node is configured with time difference information, the IAB node adjusts its the UL Tx timing and the DL Tx timing. For example, the IAB node adjusts its UL Tx timing $UL_{Tx}$ relative to the current UL Tx timing $UL_{Tx,old}$ or DL Tx timing $DL_{Tx,old}$ by $(T_{offset,p}-T_{offset,c})/2$. That is, $UL_{Tx}=DL_{Tx,old}-(T_{offset,p}-T_{offset,c})/2$ or $UL_{Tx}=DL_{Tx,old}-(T_{offset,p}-T_{offset,c})/2$. In some embodiments, the UL Tx timing $UL_{Tx}$ is adjusted based on an amount of timing adjustment relative to a current UL Tx timing ($UL_{Tx,old}$) or a current DL Tx timing ($DL_{Tx,old}$) of the first node, wherein the amount of timing adjustment is determined using $(T_{offset,p}-T_{offset,c})/2$.

In some embodiments, for the IAB node, the advance amount for the DL Tx timing $DL_{Tx}$ relative to the current UL Tx timing $UL_{Tx,old}$ is $(T_{offset,p}-T_{offset,c})/2$. That is, $DL_{Tx}=UL_{Tx,old}-(T_{offset,p}-T_{offset,c})/2$. In some embodiments, for the IAB node, the advance amount for the DL Tx timing $DL_{Tx}$ relative to the current DL Tx timing $DL_{Tx,old}$ is $(T_{offset,p}-T_{offset,c})/2$. That is, $DL_{Tx}=DL_{Tx,old}-(T_{offset,p}-T_{offset,c})/2$. In some embodiments, the DL Tx timing $DL_{Tx}$ is adjusted based on an amount of timing adjustment relative to a current UL Tx timing ($UL_{Tx,old}$) or a current DL Tx timing ($DL_{Tx,old}$) of the first node, wherein the amount of timing adjustment is determined using $(T_{offset,p}-T_{offset,c})/2$. In some embodiments, $T_{offset,p}$ is a time different at the second node between a start of an uplink reception frame i for the first node and a start of a DL Tx frame i or a time different between a start of an uplink reception frame i and a start of a DL Tx frame i of the second node. $T_{offset,p}$ is obtained based on the time difference information or parameter $T_{delta}$ received by the first node. In some embodiments, $T_{offset,c}$ is a time different between the DL Tx timing $DL_{Tx}$ and the DL Rx timing $DL_{Rx}$ of the first node, or between UL Tx timing $UL_{Tx}$ and the DL Rx timing $DL_{Rx}$ of the first node.

Figure 5:
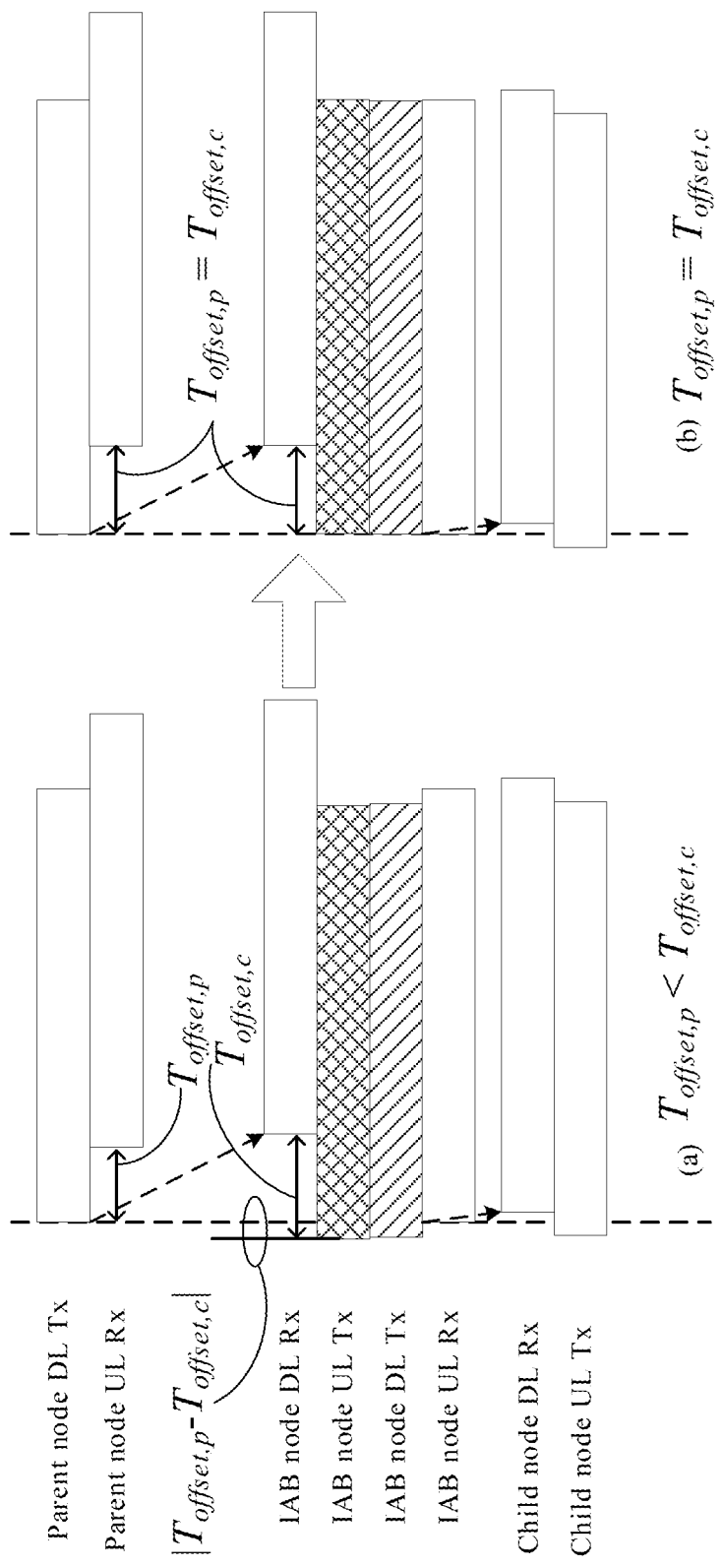
FIG. 5 illustrates a schematic diagram of an IAB node adjusting an UL Tx timing and a DL Tx timing, in accordance with some embodiments of the present disclosure.

Optionally, $T_{offset,p}$ is the time difference information between the DL Tx timing and the uplink reception timing of the parent node side (serving cell). $T_{offset,c}$ is the time difference between the DL Rx timing and the DL Tx timing or the UL Tx timing of the IAB node. FIG. 5 shows a schematic diagram of an IAB node adjusting an UL Tx timing and a DL Tx timing.

Optionally, the IAB node adjusts its UL Tx timing and DL Tx timing by $(N_{TA}+N_{TA,offset})\cdot T_c/2+T_{delta}+(T_{offset,p}-T_{offset,c})/2$ only when it is greater than 0.

Optionally, the IAB node adjusts its UL Tx timing and DL Tx timing by $(T_{offset,p}-T_{offset,c})/2$ only when it exceeds the predefined or configured timing range. In some embodiments, in response to determining that a parameter $(T_{offset,p}-T_{offset,c})/2$ is outside of a predefined or configured timing range, the first node adjusts at least one of the UL Tx timing or the DL Tx timing. In some embodiments, in response to determining that a sum of the amount of timing adjustment and a parameter $(T_{offset,p}-T_{offset,c})/2$ is greater than 0, the first node adjusts at least one of the UL Tx timing $UL_{Tx}$ and the DL Tx timing $DL_{Tx}$.

Optionally, when receiving $T_{offset,p}$, the IAB node adjusts its UL Tx timing and DL Tx timing. In some embodiments, in response to receiving a parameter $T_{offset,p}$, the first node adjusts at least one of the UL Tx timing $UL_{Tx}$ and the DL Tx timing $DL_{Tx}$. In some embodiments, the IAB node uses timing advance amount $(N_{TA}+N_{TA,offset})\cdot T_c/2+T_{delta}$ relative to its DL Rx timing to determine the UL Tx timing and the DL Tx timing. In some embodiments, IAB node reports the information related to time difference between its UL Tx timing or DL Tx timing and DL Rx timing. In some embodiments, the first node reports information related to time difference. The information related to time difference relates to one of a first timing difference between the UL Tx timing $UL_{Tx}$ and the DL Rx timing $DL_{Rx}$ of the first node, or a second timing difference between the DL Tx timing $DL_{Tx}$ and the DL Rx timing $DL_{Rx}$ of the first node.

For example, in order to maintain the DL Tx timing alignment between the IAB node and the parent node, the IAB node needs to report an actual time difference between its UL Tx timing and the DL Rx timing or between its DL Tx timing and the DL Rx timing, where the time difference is used for determining at least one of the timing advance information or parameter $T_{delta}$ by the parent node. Timing advance information is used for IAB node obtaining $N_{TA}$. The IAB node adjusts at least one of the UL Tx timing and the DL Tx timing according to $N_{TA}$, $N_{TA,offset}$ and $T_{delta}$.

Figure 6:
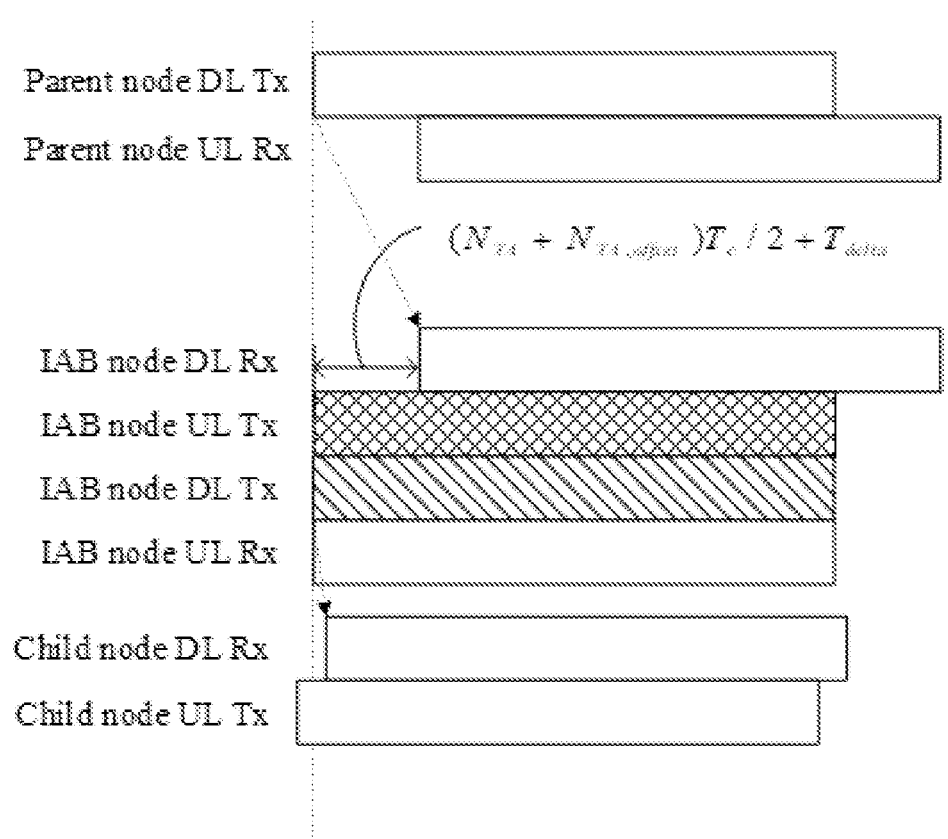
FIG. 6 illustrates schematic diagram of the IAB node determining the UL Tx timing and the DL Tx timing, in accordance with some embodiments of the present disclosure.

FIG. 6 is a schematic diagram of the IAB node determining the UL Tx timing and the DL Tx timing. For example, the advance amount for the UL Tx timing $UL_{Tx}$ and the DL Tx timing $DL_{Tx}$ of the IAB node relative to the DL Rx timing $DL_{Rx}$ of the IAB node is $(N_{TA}+N_{TA,offset})\cdot T_c/2+T_{delta}$. That is, $UL_{Tx}=DL_{Tx}=DL_{Rx}-(N_{TA}+N_{TA,offset})\cdot T_c/2-T_{delta}$. $T_{delta}$ is the time difference information between the DL Tx timing and the UL Rx timing of the parent node side (serving cell), (e.g., half the time difference between the DL Tx timing and the UL Rx timing of the parent node side (serving cell)).

The IAB node can be assumed $(N_{TA}+N_{TA,offset})\cdot T_c/2+T_{delta}$ to be the transmission delay between the IAB node and the parent node, that is, the time difference between the signal sent by the parent node (serving cell) and the signal received by the MT of the IAB node.

Optionally, the IAB node adjusts its UL Tx timing and DL Tx timing by $(N_{TA}+N_{TA,offset})\cdot T_c/2+T_{delta}$ when it is greater than 0. In some embodiments, in response to determining that the $(N_{TA}+N_{TA,offset})\cdot T_c/2+T_{delta}$ is greater than 0, the first node adjusts at least one of the UL Tx timing and the DL Tx timing.

In some embodiments, the IAB node receives the UL Tx timing configuration, where the UL Tx timing configuration is any one configuration of the following: UL Tx timing indication information, timing mode, and time resource type. In some embodiments, the IAB node uses timing advance amount $(N_{TA}+N_{TA,offset})\cdot T_c/2+T_{delta}$ relative to its DL Rx timing to determine the DL Tx timing, and determines the UL Tx timing according to the UL Tx timing configuration. In some embodiments, for the first node, the advance amount for its DL Tx timing $DL_{Tx}$ relative to its DL Rx timing $DL_{Rx}$ is $(N_{TA}+N_{TA,offset})\cdot T_c/2+T_{delta}$. That is, $DL_{Tx}=DL_{Rx}-(N_{TA}+N_{TA,offset})\cdot T_c/2-T_{delta}$. In some embodiments, the first node receives UL Tx timing configuration information. In some embodiments, the UL Tx timing configuration includes configuration information of at least one of UL Tx timing indication information, timing mode, or time resource type. In some embodiments, the UL Tx timing $UL_{Tx}$ is determined based on an amount of timing adjustment relative to DL Rx timing $DL_{Rx}$ of the first node, wherein the amount of timing adjustment is determined according to the UL Tx timing configuration. In some embodiments, the second node sends, to the first node, UL Tx timing configuration, the UL Tx timing configuration comprises configuration information of at least one of UL Tx timing indication information, timing mode, or time resource type.

As described above, there are multiple methods for the IAB node to determine the UL Tx timing according to the UL Tx timing configuration. In some embodiments, different indication information (i.e., UL Tx timing indication information) indicates different UL Tx timings. For example, if the value of the indication information is 0, the advance amount for the UL Tx timing $UL_{Tx}$ of the IAB node relative to its DL Rx timing $DL_{Rx}$ is $(N_{TA}+N_{TA,offset})\cdot T_c$. If the value of the indication information is 1, the advance amount for the UL Tx timing $UL_{Tx}$ of the IAB node relative to its DL Rx timing $DL_{Rx}$ is $(N_{TA}+N_{TA,offset})\cdot T_c/2+T_{delta}$. The meaning of the value of the indication information can be predefined in the protocol. In some embodiments, the first node determines UL Tx timing $UL_{Tx}$ based on the UL Tx timing indication information. In some embodiments, determining the UL Tx timing $UL_{Tx}$ includes, in response to determining that the UL Tx timing indication information indicates a first value, an amount of timing adjustment for the UL Tx timing $UL_{Tx}$ relative to the DL Rx timing $DL_{Rx}$ is $(N_{TA}+N_{TA,offset})\cdot T_c$, and, in response to determining that the UL Tx timing indication information indicates a second value, the amount of timing adjustment for the UL Tx timing $UL_{Tx}$ relative to the DL Rx timing $DL_{Rx}$ is $(N_{TA}+N_{TA,offset})\cdot T_c/2+T_{delta}$.

In some embodiments, different timing modes indicate different UL Tx timings. For example, if the timing mode is Case 1 timing, the advance amount for the UL Tx timing $UL_{Tx}$ of the IAB node relative to the DL Rx timing $DL_{Rx}$ is $(N_{TA}+N_{TA,offset})\cdot T_c$. If the timing mode is Case 6 or Case 7 timing, the advance amount for the UL Tx timing $UL_{Tx}$ of the IAB node relative to the DL Rx timing $DL_{Rx}$ is $(N_{TA}+N_{TA,offset})\cdot T_c/2+T_{delta}$. In some embodiments, the first node determines UL Tx timing $UL_{Tx}$ based on the configuration of the timing mode. In some embodiments, determining the UL Tx timing $UL_{Tx}$ includes, in response to determining that the timing mode corresponds to a first mode, an amount of timing adjustment for the UL Tx timing $UL_{Tx}$ relative to the DL Rx timing $DL_{Rx}$ is $(N_{TA}+N_{TA,offset})\cdot T_c$, and, in response to determining that the timing mode corresponds to a second mode, the amount of timing adjustment for the UL Tx timing $UL_{Tx}$ relative to the DL Rx timing $DL_{Rx}$ is $(N_{TA}+N_{TA,offset})\cdot T_c/2+T_{delta}$.

In some embodiments, different time resource types indicate different UL Tx timings. The time resource type refers to time resource multiplexing type, including time domain multiplexing (TDM), FDM and SDM. For example, if a time resource is used for TDM, the advance amount for the UL Tx timing $UL_{Tx}$ relative to the DL Rx timing $DL_{Rx}$ is $(N_{TA}+N_{TA,offset})\cdot T_c$. If a time resource is used for FDM or SDM, the advance amount for the UL Tx timing $UL_{Tx}$ relative to the DL Rx timing $DL_{Rx}$ is $(N_{TA}+N_{TA,offset})\cdot T_c/2+T_{delta}$. In some embodiments, the first node determines UL Tx timing $UL_{Tx}$ based on the time resource type configuration. In some embodiments, determining the UL Tx timing $UL_{Tx}$ includes, in response to determining that the time resource type corresponds to Time Division Multiplexing (TDM) resources, an amount of timing adjustment for the UL Tx timing $UL_{Tx}$ relative to the DL Rx timing $DL_{Rx}$ is $(N_{TA}+N_{TA,offset})\cdot T_c$, and, in response to determining that the time resource type corresponds to Frequency Division Multiplexing (FDM) or Space Division Multiplexing (SDM) resources, the amount of timing adjustment for the UL Tx timing $UL_{Tx}$ relative to the DL Rx timing $DL_{Rx}$ is $(N_{TA}+N_{TA,offset})\cdot T_c/2+T_{delta}$.

Optionally, the IAB node reports information related to time difference between an UL Tx timing or a DL Tx timing and a DL Rx timing of the IAB node. In some embodiments, the first node reports information related to time difference. The information related to time difference relates to one of a first timing difference between the UL Tx timing $UL_{Tx}$ and the DL Rx timing $DL_{Rx}$ of the first node, a second timing difference between the DL Tx timing $DL_{Tx}$ and the DL Rx timing $DL_{Rx}$ of the first node.

For example, in order to maintain the DL Tx timing alignment between the IAB node and the parent node, the IAB node needs to report the actual time difference between its UL Tx timing/DL Tx timing and DL Rx timing, which is used by the parent node to determine at least one of timing advance information and $T_{delta}$. The timing advance information is used to calculate $N_{TA}$ by the IAB node. The IAB node adjusts UL Tx timing and DL Tx timing based on $N_{TA}$, $N_{TA,offset}$ and $T_{delta}$.

In some embodiments, IAB nodes use different UL Tx timing and DL Tx timing on different time resources. In some embodiments, determining the UL Tx timing $UL_{Tx}$ and the DL Tx timing $DL_{Tx}$ includes determining, by the first node, first UL Tx timing $UL_{Tx}$ and first DL Tx timing $DL_{Tx}$ for a first time resource, and determining, by the first node, second UL Tx timing $UL_{Tx}$ and second DL Tx timing $DL_{Tx}$ for a second time resource.

Optionally, on the first time resource, for the IAB node, the advance amount for the UL Tx timing $UL_{Tx}$ relative to the DL Rx timing $DL_{Rx}$ is $(N_{TA}+N_{TA,offset})\cdot T_c$. That is, $UL_{Tx}=DL_{Rx}-(N_{TA}+N_{TA,offset})\cdot T_c$. In some embodiments, the advance amount for the DL Tx timing $DL_{Tx}$ relative to the DL Rx timing $DL_{Rx}$ is $(N_{TA}+N_{TA,offset})\cdot T_c/2+T_{delta}$. That is, $DL_{Tx}=DL_{Rx}-(N_{TA}+N_{TA,offset})\cdot T_c/2-T_{delta}$. In some embodiments, the first node determines a first amount of timing adjustment and a second amount of timing adjustment for the first time resource. In some embodiments, the first amount of timing adjustment for the first UL Tx timing $UL_{Tx}$ relative to DL Rx timing $DL_{Rx}$ of the first node is $(N_{TA}+N_{TA,offset})\cdot T_c$. In some embodiments, the second amount of timing adjustment for the first DL Tx timing $DL_{Tx}$ relative to DL Rx timing $DL_{Rx}$ of the first node is determined using $(N_{TA}+N_{TA,offset})\cdot T_c/2+T_{delta}$. In some embodiments, $T_{delta}$ is a parameter that corresponds to $(-\frac{1}{2})$ of a time interval at the second node between a start of an UL Rx frame i for the first node and a start of a DL Tx frame i or $(-\frac{1}{2})$ of a time interval between a start of an uplink reception frame i and a start of a DL Tx frame i of the second node.

Optionally, on the second time resource, the UL Tx timing $UL_{Tx}$ and DL Tx timing $DL_{Tx}$ of the IAB node are determined in one of several ways. For example, the advance amount for the UL Tx timing $UL_{Tx}$ and the DL Tx timing $DL_{Tx}$ relative to the DL Rx timing $DL_{Rx}$ is $(N_{TA}+N_{TA,offset})\cdot T_c$. That is, $UL_{Tx}=DL_{Tx}=DL_{Rx}-(N_{TA}+N_{TA,offset})\cdot T_c$. In some embodiments, the advance amount for the UL Tx timing $UL_{Tx}$ and the DL Tx timing $DL_{Tx}$ relative to the DL Rx timing $DL_{Rx}$ is $(N_{TA}+N_{TA,offset})\cdot T_c+\Delta T_q$. That is, $UL_{Tx}=DL_{Tx}=DL_{Rx}-(N_{TA}+N_{TA,offset})\cdot T_c-\Delta T_q$. In some embodiments, the advance amount for the UL Tx timing $UL_{Tx}$ and the DL Tx timing $DL_{Tx}$ relative to the current UL Tx timing $UL_{Tx,old}$ is $(T_{offset,p}-T_{offset,c})/2$. That is, $UL_{Tx}=DL_{Tx}=UL_{Tx,old}-(T_{offset,p}-T_{offset,c})/2$. In some embodiments, the advance amount for the UL Tx timing $UL_{Tx}$ and the DL Tx timing $DL_{Tx}$ relative to the current DL Tx timing $DL_{Tx,old}$ is $(T_{offset,p}-T_{offset,c})/2$. That is, $UL_{Tx}=DL_{Tx}=DL_{Tx,old}-(T_{offset,p}-T_{offset,c})/2$. In some embodiments, the second UL Tx timing $UL_{Tx}$ and second DL Tx timing $DL_{Tx}$ for the second time resource are determined based on a first amount of timing adjustment relative to DL Rx timing $DL_{Rx}$ of the first node. In some embodiments, the first amount of timing adjustment is determined as one of $(N_{TA}+N_{TA,offset})\cdot T_c$, $(N_{TA}+N_{TA,offset})\cdot T_c+\Delta T_q$, or $(N_{TA}+N_{TA,offset})\cdot T_c/2+T_{delta}$. In some embodiments, the second UL Tx timing $UL_{Tx}$ and second DL Tx timing $DL_{Tx}$ for the second time resource are determined based on a second amount of timing adjustment relative to a current UL Tx timing $(UL_{Tx,old})$ or a current DL Tx timing $(DL_{Tx,old})$ of the first node. In some embodiments, the second amount of timing adjustment is determined using $(T_{offset,p}-T_{offset,c})/2$.

The meaning of each parameter is the same as that in the foregoing embodiment.

Figure 7:
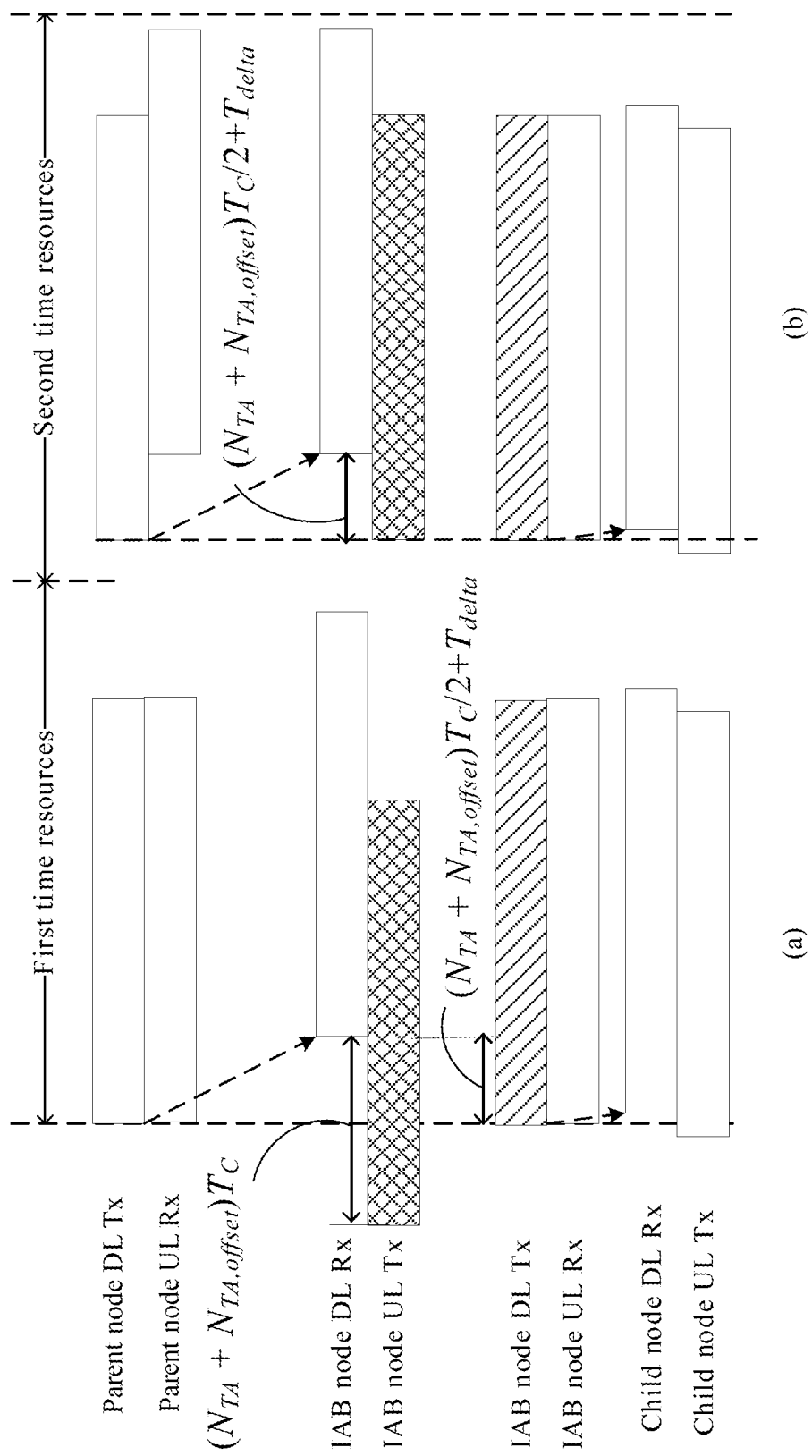
FIG. 7 illustrates a schematic diagram of the IAB node determining the UL Tx timing and the DL Tx timing, in accordance with some embodiments of the present disclosure.

On the second time resource, the advance amount for the UL Tx timing $UL_{Tx}$ and the DL Tx timing $DL_{Tx}$ of the IAB node relative to the DL Rx timing $DL_{Rx}$ is $(N_{TA}+N_{TA,offset})\cdot T_c/2+T_{delta}$. That is, $UL_{Tx}=DL_{Rx}-(N_{TA}+N_{TA,offset})\cdot T_c/2-+T_{delta}$. As an example, FIG. 7 shows a schematic diagram of the IAB node determining the UL Tx timing and the DL Tx timing.

Optionally, the first time resource is at least one of 1) time resources which the IAB node does not use in simultaneous transmission via both the parent backhaul link and the child backhaul link (or child access link) of the IAB node, 2) time resources which the IAB node does not use in simultaneous transmission or simultaneous reception via both the parent backhaul link and the child link, 3) time resources which is used for time division multiplexed between the parent backhaul link and child backhaul link (or child access link) of the IAB node, 4) time resources in which the UL Tx timing $UL_{Tx}$ of the IAB node is determined using a same mechanism as a terminal, 5) time resources determined by the IAB node by determining an amount of timing adjustment for the UL Tx timing $UL_{Tx}$ relative to DL Rx timing $DL_{Rx}$ to be $(N_{TA}+N_{TA,offset})\cdot T_c$, or 6) a time resource other than the second time resource. In some embodiments, the first time resource is at least one of (1) a time resource which the first node does not use in simultaneous transmission via both a parent backhaul link of the first node and a child link of the first node, wherein the child link is a child access link or a child backhaul link, (2) a time resource which the first node does not use in simultaneous transmission or simultaneous reception via both the parent backhaul link and the child link, (3) a time resource which is used for Time Division Multiplexed (TDM) between the parent backhaul link and the child link of the first node, (4) a time resource in which the UL Tx timing $UL_{Tx}$ of the first node is determined using a same mechanism as a terminal, or (5) a time resource determined by the first node by determining an amount of timing adjustment for the UL Tx timing $UL_{Tx}$ relative to DL Rx timing $DL_{Rx}$ to be $(N_{TA}+N_{TA,offset})\cdot T_c$.

Optionally, the second time resource is a time resource that the IAB node can simultaneously send or receive in both the parent backhaul link and the child backhaul link (or the child access link) or a time resource other than the first time resource. In some embodiments, the second time resource is a time resource which the first node uses in simultaneous transmission or simultaneous reception in both a parent backhaul link of the first node and a child link of the first node. In some embodiments, the child link is a child access link or a child backhaul link. Optionally, on the first time resource, when $(N_{TA}+N_{TA,offset})\cdot T_c/2+T_{delta}$ is greater than 0, the IAB node adjusts its DL Tx timing. Optionally, on the second time resource, when the amount of timing adjustment is greater than 0, the IAB node adjusts its UL Tx timing and DL Tx timing.

In some examples, the timing advance of the UL Tx timing $UL_{Tx}$ and the DL Tx timing $DL_{Tx}$ of the IAB node relative to the DL Rx timing $DL_{Rx}$ is T, which can refer to any of the following:

(1) the timing advance for UL Tx timing $UL_{Tx}$ of the IAB node relative to the DL Rx timing $DL_{Rx}$ is T, the timing advance of the DL Tx timing $DL_{Tx}$ of IAB node relative to the DL Rx timing $DL_{Rx}$ equals to the timing advance for UL Tx timing $UL_{Tx}$ of the IAB node relative to the DL Rx timing $DL_{Rx}$;

(2) the timing advance for DL Tx timing $DL_{Tx}$ of the IAB node relative to the DL Rx timing $DL_{Rx}$ is T, the timing advance of the UL Tx timing $UL_{Tx}$ of IAB node relative to the DL Rx timing $DL_{Rx}$ equals to the timing advance for DL Tx timing $DL_{Tx}$ of the IAB node relative to the DL Rx timing $DL_{Rx}$; or (3) the timing advance for UL Tx timing $UL_{Tx}$ of the IAB node relative to the DL Rx timing $DL_{Rx}$ is T, and the timing advance for DL Tx timing $DL_{Tx}$ of the IAB node relative to the DL Rx timing $DL_{Rx}$ is T.

T is any of the following: $(N_{TA}+N_{TA,offset})\cdot T_c$, $(N_{TA}+N_{TA,offset})\cdot T_c+\Delta T_q$, $(N_{TA}+N_{TA,offset})\cdot T_c/2+T_{delta}$, $(N_{TA}+N_{TA,offset})\cdot T_c/2+T_{delta}+(T_{offset,p}-T_{offset,c})/2$. Examples included in all above, $N_{TA}$ is obtained from the last timing advance command if $T_{delta}$ is given by signaling without timing advance command. $N_{TA}$ is obtained from the last timing advance command or latest timing advance command if $T_{delta}$ is given by signaling with timing advance command.

Figure 8:
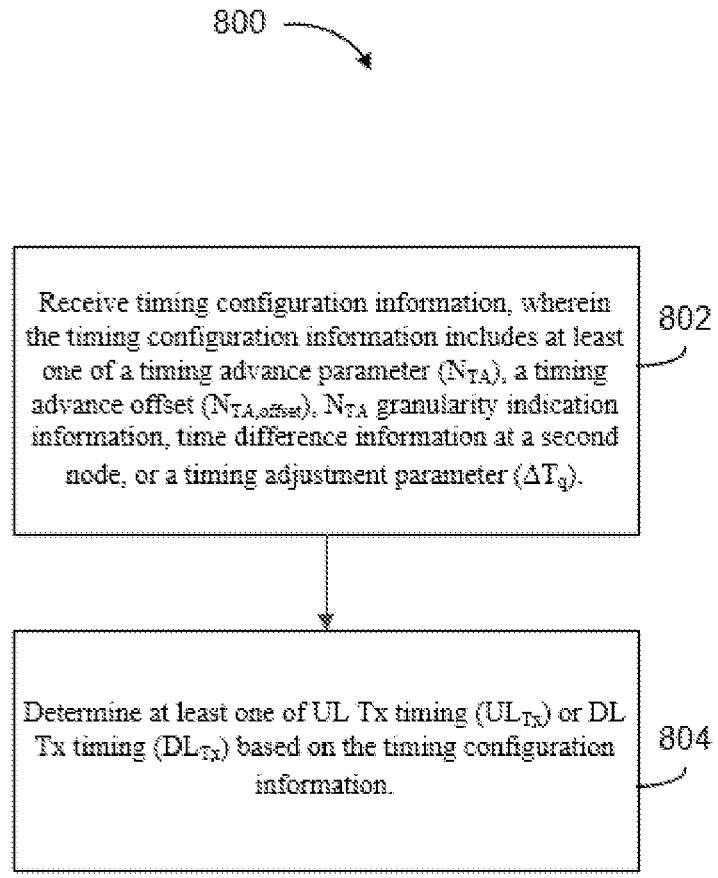
FIG. 8 illustrates a flowchart diagram illustrating a method of receiving timing configuration information and determining transmission timing in accordance with some embodiments of the present disclosure.

FIG. 8 illustrates a flowchart diagram illustrating a method 800 of receiving timing configuration information, in accordance with some embodiments of the present disclosure. Referring to FIGS. 1-7, the method 800 can be performed by a first node, in some embodiments. Additional, fewer, or different operations may be performed in the method 800 depending on the embodiment.

A first node, receives timing configuration information (802). The timing configuration information includes at least one of a timing advance parameter ($N_{TA}$), a timing advance offset ($N_{TA,offset}$), $N_{TA}$ granularity indication information, time difference information at a second node, or a timing adjustment parameter ($\Delta T_q$). The first node determines at least one of UL Tx timing ($UL_{Tx}$) or DL Tx timing ($DL_{Tx}$) based on the timing configuration information (804).

Figure 9:
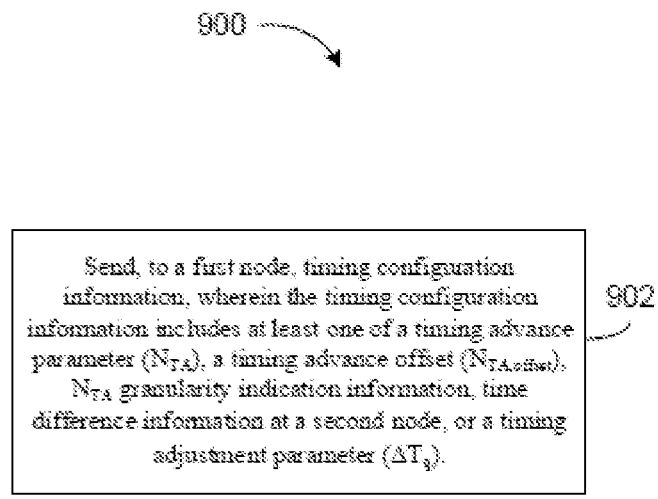
FIG. 9 illustrates a flowchart diagram illustrating a method of sending timing configuration information, in accordance with some embodiments of the present disclosure.

FIG. 9 illustrates a flowchart diagram illustrating a method 900 of sending timing configuration information, in accordance with some embodiments of the present disclosure. Referring to FIGS. 1-8, the method 900 can be performed by a second node in some embodiments. Additional, fewer, or different operations may be performed in the method 900 depending on the embodiment.

A second node sends, to a first node, timing configuration information (902). The timing configuration information includes at least one of a timing advance parameter ($N_{TA}$), a timing advance offset ($N_{TA,offset}$), $N_{TA}$ granularity indication information, time difference information at a second node, or a timing adjustment parameter ($\Delta T_q$).

In all the above embodiments, the parent node may be at least one of the following: an IAB node, an IAB donor, a centralized unit CU, an IAB node DU, an IAB donor DU, and a serving cell. In all the above embodiments, the information related to the time difference reported by the IAB node, the time difference information notified by the parent node, and $N_{TA}$, etc., can adopt a finer granularity, such as the granularity is 64Tc for frequency range 1 and 32Tc for frequency range 2; or the granularity relates to subcarrier spacing and less than $16 \cdot 64/2^\mu \cdot T_c$; or other value. In all the above embodiments, $N_{TA}$ is a value indicated by timing advance parameter, $\Delta T_q$ is a value indicated by timing adjustment parameter. In the case of no conflict, all the above embodiments can be arbitrarily combined.

Figure 10:
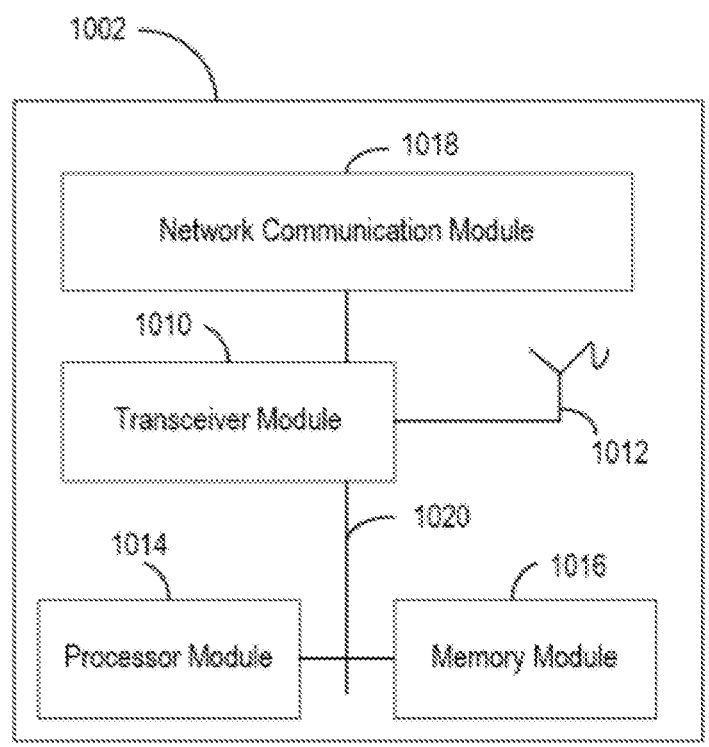
FIG. 10 illustrates a block diagram of an example communication node, in accordance with some embodiments of the present disclosure.

FIG. 10 illustrates a block diagram of an example communication node 102, in accordance with some embodiments of the present disclosure. Referring to FIGS. 1-10, the communication node 1002 is an example implementation of the first node, the second node, or the third node as described herein.

The communication node 1002 can include components and elements configured to support known or conventional operating features that need not be described in detail herein. In one illustrative embodiment, the communication node 1002 can be used to communicate (e.g., transmit and receive) data symbols in a wireless communication environment, as described above. For instance, the communication node 1002 can be a communication node used to implement various network functions.

The communication node 1002 includes one or more a transceiver module 1010, an antenna 1012, a processor module 1014, a memory module 1016, and a network communication module 1018. The modules 1010, 1012, 1014, 1016, and 1018 are operatively coupled to and interconnected with one another via a data communication bus 1020. The communication node 1002 communicates with another communication node (such as but not limited to, the communication node 1002) via a communication channel, which can be any wireless channel or other medium suitable for transmission of data as described herein.

In some examples, the communication node 1002 can further include any number of modules other than the modules shown in FIG. 10. The various illustrative blocks, modules, circuits, and processing logic described in connection with the embodiments disclosed herein can be implemented in hardware, computer-readable software, firmware, or any practical combination thereof. To illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. The embodiments described herein can be implemented in a suitable manner for each particular application, but any implementation decisions should not be interpreted as limiting the scope of the present disclosure.

In accordance with some embodiments, the transceiver module 1010 includes a radio frequency (RF) transmitter and a RF receiver each including circuitry that is coupled to the antenna 1012. A duplex switch (not shown) may alternatively couple the RF transmitter or receiver to the antenna in time duplex fashion. A duplex switch may alternatively couple the RF transmitter or receiver to the antenna 1012 in time duplex fashion. The operations of the transceiver module 1010 can be coordinated in time with the transceiver module of another communication node such that the receiver circuitry is coupled to the antenna 1012 for reception of transmissions over a wireless transmission link at the same time that the transmitter of the other communication node is coupled to an antenna of the other communication node. In some embodiments, there is close time synchronization with a minimal guard time between changes in duplex direction.

The transceiver module 1010 and the transceiver module (such as but not limited to, the transceiver module 1010) of another communication node are configured to communicate via the wireless data communication link, and cooperate with a suitably configured RF antenna arrangement that can support a particular wireless communication protocol and modulation scheme. In some illustrative embodiments, the transceiver module 1010 is configured to support industry standards such as the Long Term Evolution (LTE) and emerging 5G standards, and the like. It is understood, however, that the present disclosure is not necessarily limited in application to a particular standard and associated protocols. Rather, the transceiver module 1010 may be configured to support alternate, or additional, wireless data communication protocols, including future standards or variations thereof.

The processor module 1014 can be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the method or algorithm disclosed herein can be embodied directly in hardware, in firmware, in a software module executed by processor module 1014, respectively, or in any practical combination thereof. The memory module 1016 may be realized as RAM memory, flash memory, ROM memory, EPROM memory, EEPROM memory, registers, a hard disk, a removable disk, a CD-ROM, or any other form of storage medium known in the art. In this regard, memory module 1016 may be coupled to the processor module 1014, respectively, such that the processor module 1014 can read information from, and write information to, the memory module 1016. The memory module 1016 may also be integrated into the processor module 1014. In some embodiments, the processor module 1014 may include a cache memory for storing temporary variables or other intermediate information during execution of instructions to be executed by processor module 1014. The memory module 1016 may also include non-volatile memory for storing instructions to be executed by the processor module 1014.

The network communication module 1018 generally represents the hardware, software, firmware, processing logic, and/or other components of the communication node 1002 that enable bi-directional communication between the transceiver module 1010 and other network components and communication nodes in communication with the communication node 1002. For example, the network communication module 1018 may be configured to support internet or WiMAX traffic. In a deployment, without limitation, the network communication module 1018 provides an 802.3 Ethernet interface such that the transceiver module 1010 can communicate with a conventional Ethernet based computer network. In this manner, the network communication module 1018 may include a physical interface for connection to the computer network (e.g., Mobile Switching Center (MSC)). In some embodiments, the network communication module 1018 includes a fiber transport connection configured to connect the communication node 1002 to a core network. In the examples in which the communication node is a wireless communication device (e.g., a UE or a terminal), the communication node 1002 may not include the network communication module 1018.

The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module"), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method, comprising:
receiving, by a first node, timing configuration information, the timing configuration information comprises at least one of a timing advance parameter ($N_{TA}$), a timing advance offset ($N_{TA,offset}$), $N_{TA}$ granularity indication information, time difference information at a second node, or a timing adjustment parameter ($\Delta T_q$);
determining, by the first node, at least one of uplink transmission (UL Tx) timing or downlink transmission (DL Tx) timing based on the timing configuration information; and
adjusting, by the first node, at least one of the UL Tx timing or the DL Tx timing by:
adjusting the UL Tx timing based on an amount of timing adjustment relative to a current UL Tx timing or a current DL Tx timing of the first node, wherein the amount of timing adjustment is determined using $(T_{offset,p} - T_{offset,c})/2$; or
adjusting the DL Tx timing based on the amount of timing adjustment relative to a current UL Tx timing or a current DL Tx timing of the first node, wherein the amount of timing adjustment is determined using $(T_{offset,p} - T_{offset,c})/2$, wherein $T_{offset,p}$ is a time different at the second node between a start of a UL Rx frame i for the first node and a start of a DL Tx frame i and is obtained based on the time difference information or parameter $T_{delta}$ received by the first node, $T_{offset,c}$ is a time different between the DL Tx timing and the DL Rx timing of the first node, or between the UL Tx timing and the DL Rx timing of the first node.

2. The method of claim 1, wherein at least one of:
the UL Tx timing is determined based on an amount of timing adjustment relative to downlink reception (DL Rx) timing of the first node, wherein the amount of timing adjustment is determined using $(N_{TA} + N_{TA,offset}) \cdot T_c$; or
the DL Tx timing is determined based on the amount of timing adjustment relative to the DL Rx timing of the first node, wherein the amount of timing adjustment is determined using $(N_{TA} + N_{TA,offset}) \cdot T_c$.

3. The method of claim 1, further comprising reporting, by the first node, information related to time difference between reference timing and the DL Rx timing of the first node, wherein the reference timing is one of the UL Tx timing or the DL Tx timing of the first node, and the information related to the time difference is one of:

$$\frac{1}{N}$$

multiplied by a first actual timing difference between the UL Tx timing and the DL Rx timing of the first node;

$$\frac{1}{M}$$

multiplied by a second actual timing difference between the DL Tx timing and the DL Rx timing of the first node;

$$\frac{1}{K}$$

multiplied by the timing advance amount (TA), wherein TA is an accumulation of $N_{TA}$ indicated by timing advance parameters received by the first node or a time difference between the UL Tx timing and the DL Rx timing of the first node excluding the timing advance offset ($N_{TA,offset}$); or $$\frac{1}{L}$$

multiplied by the sum of TA and the timing advance offset ($N_{TA,offset}$),
wherein each of N, M, K, and L is an integer.

4. The method of claim 1, wherein the time difference information relates to $$\frac{1}{N}$$

of a time interval at the second node between a start of a uplink reception (UL Rx) frame i for the first node and a start of a DL Tx frame i, or $$\frac{1}{N}$$

of a time interval between a start of a UL Rx frame i and a start of a DL Tx frame i of the second node, wherein N is an integer.

5. The method of claim 1, further comprising reporting, by the first node, $N_{TA}$ granularity capability information supported by the first node.

6. The method of claim 1, wherein at least one of:
the UL Tx timing is determined based on an amount of timing adjustment relative to DL Rx timing of the first node, wherein the amount of timing adjustment is determined using $(N_{TA}+N_{TA,offset}) \cdot T_c + \Delta T_q$; or
the DL Tx timing is determined based on the amount of timing adjustment relative to the DL Rx timing of the first node, wherein the amount of timing adjustment is determined using $(N_{TA}+N_{TA,offset}) \cdot T_c$.

7. The method of claim 1, wherein at least one of:
the UL Tx timing is determined based on an amount of timing adjustment relative to DL Rx timing of the first node, wherein the amount of timing adjustment is determined using $(N_{TA}+N_{TA,offset}) \cdot T_{c2} + T_{delta}$; or
the DL Tx timing is determined based on the amount of timing adjustment relative to the DL Rx timing of the first node, wherein the amount of timing adjustment is determined using $(N_{TA}+N_{TA,offset}) \cdot T_{c12} + T_{delta}$, wherein $T_{delta}$ is a parameter that corresponds to $(-\frac{1}{2})$ of a time interval at the second node between a start of a UL Rx frame i for the first node and a start of a DL Tx frame i.

8. The method of claim 1, further comprising in response to determining that a parameter $$\frac{(T_{offset,p} - T_{offset,c})}{2}$$

is outside of a predefined or configured timing range, the first node adjusts at least one of the UL Tx timing or the DL Tx timing.

9. The method of claim 1, further comprising: in response to receiving a parameter $T_{offset,p}$, the first node adjusts at least one of the UL Tx timing and the DL Tx timing.

10. The method of claim 1, further comprising:
receiving, by the first node, UL Tx timing configuration, the UL Tx timing configuration comprises configuration information of at least one of UL Tx timing indication information, timing mode, or time resource type, wherein at least one of:
the UL Tx timing is determined based on an amount of timing adjustment relative to DL Rx timing of the first node, wherein the amount of timing adjustment is determined using the UL Tx timing configuration; or
the DL Tx timing is determined based on the amount of timing adjustment relative to the DL Rx timing of the first node, wherein the amount of timing adjustment is determined using $(N_{TA}+N_{TA,offset}) \cdot T_c/2 + T_{delta}$.

11. The method of claim 10, further comprising determining, by the first node, UL Tx timing based on the UL Tx timing configuration, wherein determining the UL Tx timing comprises:
in response to determining that the UL Tx timing indication information indicates a first value, an amount of timing adjustment for the UL Tx timing relative to the DL Rx timing is $(N_{TA}+N_{TA,offset}) \cdot T_c$; and
in response to determining that the UL Tx timing indication information indicates a second value, the amount of timing adjustment for the UL Tx timing relative to the DL Rx timing is $(N_{TA}+N_{TA,offset}) \cdot T_c/2 + T_{delta}$.

12. The method of claim 10, further comprising determining, by the first node, UL Tx timing based on the UL Tx timing configuration, wherein determining the UL Tx timing comprises:
in response to determining that the timing mode corresponds to a first mode, an amount of timing adjustment for the UL Tx timing relative to the DL Rx timing is $(N_{TA}+N_{TA,offset}) T_c$; and
in response to determining that the timing mode corresponds to a second mode, the amount of timing adjustment for the UL Tx timing relative to the DL Rx timing is $(N_{TA}+N_{TA,offset}) \cdot T_c/2 + T_{delta}$.

13. The method of claim 10, further comprising determining, by the first node, UL Tx timing based on the UL Tx timing configuration, wherein determining the UL Tx timing comprises: in response to determining that the time resource type corresponds to Time Division Multiplexing (TDM) resources, an amount of timing adjustment for the UL Tx timing relative to the DL Rx timing is $(N_{TA}+N_{TA,offset}) \cdot T_c$;
in response to determining that the time resource type corresponds to Frequency Division Multiplexing (FDM) or Space Division Multiplexing (SDM) resources, the amount of timing adjustment for the UL Tx timing relative to the DL Rx timing is $(N_{TA}+N_{TA,offset}) \cdot T_c/2 + T_{delta}$.

14. The method of claim 1, wherein
determining the UL Tx timing and the DL Tx timing comprises:
determining, by the first node, first UL Tx timing and first DL Tx timing for a first time resource; and
determining, by the first node, second UL Tx timing and second DL Tx timing for a second time resource.

15. The method of claim 14, further comprising determining a first amount of timing adjustment and a second amount of timing adjustment for the first time resource, wherein at least one of:
the first amount of timing adjustment for the first UL Tx timing relative to DL Rx timing of the first node is $(N_{TA}+N_{TA,offset}) \cdot T_c$; or
the second amount of timing adjustment for the first DL Tx timing relative to DL Rx timing of the first node is $(N_{TA}+N_{TA,offset}) \cdot T_c/2 + T_{delta}$, wherein $T_{delta}$ is a parameter that corresponds to $(-\frac{1}{2})$ of a time interval at the second node between a start of a UL Rx frame i for the first node and a start of a DL Tx frame i.

16. The method of claim 14, wherein at least one of:
the second UL Tx timing and second DL Tx timing for the second time resource are determined based on at least one of:
a first amount of timing adjustment relative to DL Rx timing of the first node, wherein the first amount of timing adjustment is determined as one of:

$(N_{TA}+N_{TA,offset}) \cdot T_c$; or $(N_{TA}+N_{TA,offset}) \cdot T_c + \Delta T_q$; or $(N_{TA}+N_{TA,offset}) \cdot T_{c12} + T_{delta}$; or a second amount of timing adjustment relative to a current UL Tx timing or a current DL Tx timing of the first node, wherein the second amount of timing adjustment is determined using $(T_{offset,p} - T_{offset,c})/2$.

17. The method of claim 14, wherein:
the first time resource is at least one of:
(1) a time resource which the first node does not use in simultaneous transmission via both a parent backhaul link of the first node and a child link of the first node, wherein the child link is a child access link or a child backhaul link;
(2) a time resource which the first node does not use in simultaneous transmission or simultaneous reception via both the parent backhaul link and the child link;
(3) a time resource comprising Time Division Multiplexed (TDM) time resource of the parent backhaul link and the child link of the first node;
(4) a time resource in which the UL Tx timing of the first node is determined using a same mechanism as a UL Tx timing of a terminal; or
(5) a time resource determined by the first node by determining an amount of timing adjustment for the UL Tx timing relative to DL Rx timing to be $(N_{TA}+N_{TA,offset}) \cdot T_c$; or the second time resource is a time resource which the first node uses in simultaneous transmission or simultaneous reception in both a parent backhaul link of the first node and a child link of the first node, wherein the child link is a child access link or a child backhaul link, or a time resource other than the first time resource.

18. A first node, comprising:
at least one processor configured to:
receive, via a receiver, timing configuration information, the timing configuration information comprises at least one of a timing advance parameter ($N_{TA}$), a timing advance offset ($N_{TA,offset}$), $N_{TA}$ granularity indication information, time difference information at a second node, or a timing adjustment parameter ($\Delta T_q$);
determine at least one of uplink transmission (UL Tx) timing or downlink transmission (DL Tx) timing based on the timing configuration information; and
adjust at least one of the UL Tx timing or the DL Tx timing by:
adjusting the UL Tx timing based on an amount of timing adjustment relative to a current UL Tx timing or a current DL Tx timing of the first node, wherein the amount of timing adjustment is determined using $(T_{offset,p}-T_{offset,c})/2$; or
adjusting the DL Tx timing based on the amount of timing adjustment relative to a current UL Tx timing or a current DL Tx timing of the first node, wherein the amount of timing adjustment is determined using $(T_{offset,p}-T_{offset,c})/2$, wherein $T_{offset,p}$ is a time different at the second node between a start of a UL Rx frame i for the first node and a start of a DL Tx frame i and is obtained based on the time difference information or parameter Tdelta received by the first node, $T_{offset,c}$ is a time different between the DL Tx timing and the DL Rx timing of the first node, or between the UL Tx timing and the DL Rx timing of the first node.

19. A method, comprising:
sending, by a second node to a first node, timing configuration information, the timing configuration information comprises at least one of a timing advance parameter ($N_{TA}$), a timing advance offset ($N_{TA,offset}$), $N_{TA}$ granularity indication information, time difference information at a second node, or a timing adjustment parameter ($\Delta T_q$),
wherein at least one of UL Tx timing or DL Tx timing of the first node is determined according to the timing configuration information, and
wherein the first node adjusts at least one of the UL Tx timing or the DL Tx timing by:
adjusting the UL Tx timing based on an amount of timing adjustment relative to a current UL Tx timing or a current DL Tx timing of the first node, wherein the amount of timing adjustment is determined using $(T_{offset,p}-T_{offset,c})/2$; or
adjusting the DL Tx timing based on the amount of timing adjustment relative to a current UL Tx timing or a current DL Tx timing of the first node, wherein the amount of timing adjustment is determined using $(T_{offset,p}-T_{offset,c})/2$, wherein $T_{offset,p}$ is a time different at the second node between a start of a UL Rx frame i for the first node and a start of a DL Tx frame i and is obtained based on the time difference information or parameter $T_{delta}$ received by the first node, $T_{offset,c}$ is a time different between the DL Tx timing and the DL Rx timing of the first node, or between the UL Tx timing and the DL Rx timing of the first node.

20. A second node, comprising:
at least one processor configured to:
send, via a transmitter to a first node, timing configuration information, the timing configuration information comprises at least one of a timing advance parameter ($N_{TA}$), a timing advance offset ($N_{TA,offset}$), $N_{TA}$ granularity indication information, time difference information at a second node, or a timing adjustment parameter ($\Delta T_q$),
wherein at least one of UL Tx timing or DL Tx timing of the first node is determined according to the timing configuration information, and
wherein the first node adjusts at least one of the UL Tx timing or the DL Tx timing by:
adjusting the UL Tx timing based on an amount of timing adjustment relative to a current UL Tx timing or a current DL Tx timing of the first node, wherein the amount of timing adjustment is determined using $(T_{offset,p}-T_{offset,c})/2$; or
adjusting the DL Tx timing based on the amount of timing adjustment relative to a current UL Tx timing or a current DL Tx timing of the first node, wherein the amount of timing adjustment is determined using $(T_{offset,p}-T_{offset,c})/2$, wherein $T_{offset,p}$ is a time different at the second node between a start of a UL Rx frame i for the first node and a start of a DL Tx frame i and is obtained based on the time difference information or parameter Tdelta received by the first node, $T_{offset,c}$ is a time different between the DL Tx timing and the DL Rx timing of the first node, or between the UL Tx timing and the DL Rx timing of the first node.

* * * * *